May 19, 1931.    C. SUNDSTROM ET AL    1,806,096
PRODUCTION OF A CONCENTRATED CAUSTIC SODA PRODUCT
Filed April 9, 1925
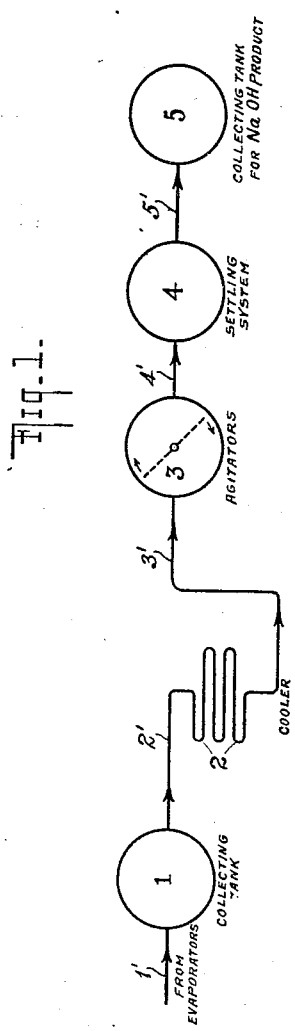
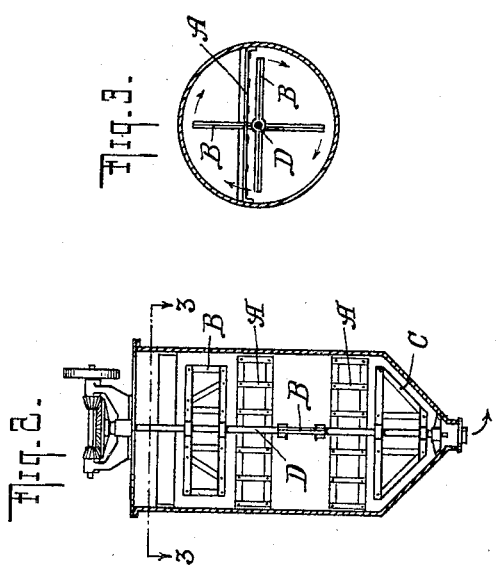
WITNESS
G. V. Rasmussen
INVENTORS
CARL SUNDSTROM
COKE S. LYKES
BY
ATTORNEYS Patented May 19, 1931

1,806,096

UNITED STATES PATENT OFFICE

CARL SUNDSTROM AND COKE S. LYKES, OF SYRACUSE, NEW YORK, ASSIGNORS TO SOLVAY PROCESS COMPANY, OF SOLVAY, NEW YORK, A CORPORATION OF NEW YORK

PRODUCTION OF A CONCENTRATED CAUSTIC SODA PRODUCT

Application filed April 9, 1925. Serial No. 21,879.

Our invention relates to the production of strong caustic soda (NaOH), either liquid or solid, and has for its object to obtain a high yield of a product of marketable purity, with a method which is economical as regards time and cost.

Crude caustic soda liquors, such as are obtained by the so-called lime process are subjected to a concentrating treatment in order to obtain caustic liquor or solid of the desired caustic strength. In the procedure as practiced hitherto, considerable difficulties have been experienced as regards the removal, in connection with the concentration, of the impurities present in the original crude weak liquor. These impurities consist chiefly of dissolved, unconverted soda ash and sulfur compounds, it being understood that in the lime process, crude sodium carbonate (soda ash) is treated with lime in the presence of water and the resultant weak caustic soda solution separated from the calcium carbonate precipitate.

The practice employed hitherto consists in concentrating the weak caustic solution to a point corresponding to the strength of the market product desired, for instance, to about 45–50% NaOH if a liquid product is to be obtained, or to about 98% NaOH if the product is to be solid. As the concentration of the weak liquor progresses, the concentration of the impurities also increases and a large proportion of them is thrown out of solution as sodium carbonate and sodium sulfate owing to the increase in their concentration and to the decrease of their solubility with increasing caustic concentration. To get rid of these impurities, the concentration has usually been interrupted when the caustic reaches a strength of from 30 to 50%, and the liquor let stand undisturbed for a relatively long period of time in large tanks where the major portion of the sodium carbonate and sulfate gradually settles to the bottom. The thus purified supernatant liquor is then drawn off as product or subjected to further concentration if a more concentrated product is desired.

The settling operation as conducted heretofore has required a considerable length of time and the employment of large tanks, and has also been unsatisfactory because the results were by no means uniform, both as to duration of operation and as to degree of removal of the impurities.

The present invention uses simpler apparatus and accomplishes very superior results. The salient feature of the improved treatment consists in subjecting the caustic liquor to vigorous agitation prior to the settling or removal of the precipitated impurities. The result is more uniform, the product purer, and the time of the treatment is reduced. In other words, a greater proportion of the impurities settles out and can be removed, and this settling takes place at an increased rate.

The solubility of the impurities in the caustic liquor depends on the temperature and concentration of the liquor. These factors also control the viscosity of the liquor and consequently the rate at which the finely divided particles constituting the last portions of the precipitated impurities will settle out of the liquor. But while either a decrease in temperature or an increase in concentration will increase the amount of impurities thrown out of solution, this change will at the same time hinder the removal, by settling, of the last portions of the precipitated and suspended impurities. For example, we have found that when the operation is conducted below a certain fairly definite temperature, the last or more finely divided portions of the precipitated impurities will not settle out satisfactorily, and therefore, instead of being removed, will remain suspended in the liquor. An important advantage secured by the vigorous agitation which, according to our present invention, precedes the settling operation, is a lowering of this limit or minimum temperature below which satisfactory settling is not obtained. The employment of such vigorous agitation therefore enables us to carry out the purification (settling operation) at a lower liquor temperature (or higher concentration) than formerly and therefore under conditions which increase the amount of impurities precipitated. This limiting settling temperature or viscosity value will vary, of course, with the nature of the particular caustic liquor under treatment and the type or degree of agitation to which it has been subjected. For example, under the conditions hereinafter described as illustrative of the present invention, the minimum settling temperature for a caustic liquor of 49% NaOH is about 67° C., while it is 62° C. for 47% and 53° C. for 44% liquor. This corresponds to a viscosity of about .0135 dynes per square cm. As the concentration of the caustic liquor increases, this minimum temperature becomes increasingly sharply defined. Temperature control therefore is an important factor in the improved process, as well as agitation before the settling operation.

In the accompanying drawings, we have illustrated, as an example, an apparatus suitable for the purification of a 47% sodium hydroxide liquor in accordance with our invention. Fig. 1 is a diagrammatic representation (or flow sheet) of the entire apparatus; Fig. 2 is a vertical section of the agitators and Fig. 3 a horizontal section on line 3—3 of Fig. 2.

The hot caustic liquor of about 47% strength, together with the sodium carbonate and sodium sulfate already precipitated and having total carbonate sulfate contents of about 15 parts by weight each per 100 parts by weight of caustic soda, passes from the evaporators (not shown) through a line or conduit 1' to the collection tank 1 and then a conduit 2' to the cooling coils 2, cooled in any well-known or approved manner. From the cooler the liquor with the salts suspended therein passes through a pipe 3' to the agitator section 3 (consisting either of a single agitator or of a plurality of agitators connected in series). Any suitable construction may be employed for the agitator, for instance the one shown in Figs. 2 and 3, where fixed baffles A co-operate with rotary stirrers B, C, secured to a shaft D. In the agitator section, the cooled liquor is subjected to vigorous mass agitation i. e. agitation which causes the undissolved suspended solids to come into contact with the cooled liquor in a large body of such liquor. With apparatus such as illustrated satisfactory results will be obtained in from six to seven hours if the shaft D rotates at 16 revolutions per minute. The time allowed for the agitation treatment must be increased if the shaft is rotated more slowly; for instance, with 8 or 9 revolutions per minute, agitation should be continued for from twelve to sixteen hours.

After such agitation, the liquor passes through a conduit 4' to the settling system 4 consisting of one or more suitable tanks or vessels. The cooling action in the coils 2 is so regulated that the exit temperature of the clear liquor from the settling system 4 is preferably about from 63 to 65° C.

The clear liquor is collected in a tank 5, through inlet connections 5' and may be used as a marketable finished product, or subjected to further evaporation.

The remarkable purity of the product obtained by this new process will be realized when it is stated that it contains less than 0.65 parts by weight of total sodium carbonate plus sodium sulfate per 100 parts NaOH. The time required for the settling operation is much less than heretofore when even 24 hours was insufficient in some cases to obtain satisfactory results. The size of the settling apparatus required in our process is also less than heretofore.

We consider it probable that a caustic liquor such as comes from the evaporators or concentrators and containing suspended carbonate and sulfate is in a supersaturated condition with respect to these salts and, if left undisturbed, will remain more or less supersaturated for a number of hours, and that vigorous agitation of such a solution has a twofold useful effect: First, the supersaturated condition is not so persistent, that is, the precipitation of the salts from the solution is promoted, and second, the average size of the precipitated and suspended salt particles is increased. Whatever may be the true explanation, the net effect of agitation is a very marked improvement both in the amount of impurity removed and in time required for the settling or other separating operation.

Although a continuous operation is not absolutely essential, we prefer to conduct the whole purification process continuously by maintaining a constant flow of liquor to the agitators 3 and effecting a constant corresponding removal of clear purified liquor from the settling system 4.

With a suitable installation, the cooling and agitation, instead of being carried out in separate parts of the apparatus (2 and 3 in Fig. 1) might be carried out simultaneously in one and the same part of the apparatus.

Various modifications may be made without departing from the nature of our invention as set forth in the appended claims.

We claim:

1. The process of purifying caustic soda, which consists in cooling and agitating a concentrated crude caustic soda solution accompanied by undissolved suspended alkali metal salt impurities and thereupon causing the impurities to settle while maintaining such temperature in the solution as is adapted to insure an effective separation of such impurities from the solution in its quiescent condition during the settling period.

2. The process of producing a purified concentrated caustic soda product which comprises concentrating crude dilute caustic soda liquor containing alkali metal salt impurities by evaporation to produce a concentrated liquor accompanied by undissolved suspended alkali metal salt impurities, reducing the temperature of the thus concentrated liquor to a temperature no lower than that of the liquor during the subsequent settling stage, subjecting the thus cooled liquor to mass agitation, thereupon causing the impurities to settle, while maintaining in the solution a temperature which approximates the minimum temperature adapted for adequate separation of such impurities out of a solution of the caustic strength of the solution under treatment and finally separating the purified concentrated caustic liquor from the settled impurities.

3. In the process of producing a concentrated caustic alkali product which consists in preparing a crude concentrated caustic alkali solution accompanied by undissolved suspended alkali metal salt impurities and then effecting separation between the impurities and the purified solution, that improvement which comprises subjecting the said crude solution prior to said separation to cooling and to vigorous mass agitation of the cooled solution.

4. In the process of producing a concentrated caustic alkali product which consists in preparing a crude concentrated caustic alkali solution accompanied by undissolved suspended alkali metal salt impurities and then effecting separation between the impurities and the purified solution, that improvement which comprises subjecting the said crude solution prior to the said separation to cooling to approximately the minimum temperature appropriate for the settling stage with reference to the strength of the particular solution undergoing treatment and to a vigorous mass agitation of the thus cooled solution.

5. The process which consists in subjecting a concentrated crude caustic soda solution accompanied by undissolved suspended alkali metal salt impurities to cooling and vigorous mass agitation followed by settling of impurities and removal of the purified liquid product.

6. In a process of producing a purified alkali product from a crude caustic alkali solution containing alkali metal salt impurities, involving concentrating the said crude solution to convert a portion of the alkali metal salt impurities into the form of undissolved, minutely divided particles and effecting separation between the undissolved impurities and the concentrated caustic alkali solution, that improvement which comprises subjecting the crude concentrated solution prior to said separation to vigorous mass agitation at a temperature substantially below the boiling point thereof to cause substantial further conversion of dissolved impurities into undissolved form and to promote conversion of the undissolved particles into settleable form prior to said separation, thereby permitting substantial increase in removal of impurities from the solution.

In testimony whereof we have hereunto set our hands.

CARL SUNDSTROM.
COKE S. LYKES.